(12) United States Patent
Neitzel et al.

(10) Patent No.: US 9,307,071 B2
(45) Date of Patent: Apr. 5, 2016

(54) MOBILE WIRELESS DEVICE INCORPORATING SELF-DETECTION OF OPERATIONAL ENVIRONMENT AND SELECTIVE DEVICE FUNCTIONALITY

(71) Applicant: United States Cellular Corporation, Chicago, IL (US)

(72) Inventors: Erik Paul Neitzel, Chicago, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 52 days.

(21) Appl. No.: 14/321,279

(22) Filed: Jul. 1, 2014

(65) Prior Publication Data

US 2016/0006860 A1    Jan. 7, 2016

(51) Int. Cl.
| | |
|---|---|
| H04M 3/00 | (2006.01) |
| H04M 1/725 | (2006.01) |
| H04W 4/02 | (2009.01) |
| H04M 1/02 | (2006.01) |

(52) U.S. Cl.
CPC ........ *H04M 1/72577* (2013.01); *H04M 1/0264* (2013.01); *H04M 1/72569* (2013.01); *H04M 1/72572* (2013.01); *H04W 4/021* (2013.01); *H04W 4/026* (2013.01)

(58) Field of Classification Search
CPC ............... H04M 1/72577; H04M 1/72569; H04M 1/0264; H04M 1/72572; H04W 4/021; H04W 4/026
USPC .......................................... 455/418, 419, 420
See application file for complete search history.

(56) References Cited

U.S. PATENT DOCUMENTS

| | | | |
|---|---|---|---|
| 7,181,229 B2 | 2/2007 | Singh et al. | |
| 7,856,203 B2 | 12/2010 | Lipovski | |
| 8,295,854 B2 | 10/2012 | Osann, Jr. | |
| 8,315,617 B2 | 11/2012 | Tadayon et al. | |
| 8,401,578 B2 | 3/2013 | Inselberg | |
| 2005/0046584 A1* | 3/2005 | Breed ................ | B60C 11/24 340/13.31 |
| 2005/0255874 A1 | 11/2005 | Stewart-Baxter et al. | |

(Continued)

FOREIGN PATENT DOCUMENTS

| | | |
|---|---|---|
| EP | 2099203 A1 | 9/2009 |
| EP | 2216970 A1 | 8/2010 |
| EP | 2335438 A2 | 6/2011 |
| EP | 2442538 A1 | 4/2012 |
| WO | WO 2009/105125 A1 | 8/2009 |
| WO | WO 2010/062754 A1 | 6/2010 |

*Primary Examiner* — Shahriar Behnamian
(74) *Attorney, Agent, or Firm* — Leydig, Voit & Mayer, Ltd.

(57) ABSTRACT

A mobile wireless device conditionally disables device functionality when a driver is detected to be the user while in a moving vehicle. The device comprises sensors for sensing: motion, thermal images, and a vehicle cabin side. A processor is configured to perform a method including detecting whether the device is traveling within a moving vehicle; capture thermal image data points at multiple spatial locations; and render spatially binned thermal image data from the image data points. The processor is further configured to invoke a driver in possession mode of operation of the device in response to determining that: (1) the device performed the capturing while located in the front seat of the moving vehicle, by applying a front seat thermal image signature definition to the spatially binned thermal image data, and (2) the device is located on a driver side of the moving vehicle.

27 Claims, 3 Drawing Sheets

(56) References Cited

U.S. PATENT DOCUMENTS

| | | | |
|---|---|---|---|
| 2012/0214463 A1* | 8/2012 | Smith | H04M 1/72577 455/418 |
| 2012/0244849 A1 | 9/2012 | Thomson | |
| 2012/0252350 A1 | 10/2012 | Steinmetz et al. | |
| 2012/0253552 A1 | 10/2012 | Skelton | |
| 2012/0329444 A1 | 12/2012 | Osann, Jr. | |
| 2014/0045477 A1* | 2/2014 | Ewell, Jr. | H04W 4/027 455/418 |
| 2014/0134992 A1* | 5/2014 | Ludick | G06K 9/00832 455/418 |

* cited by examiner

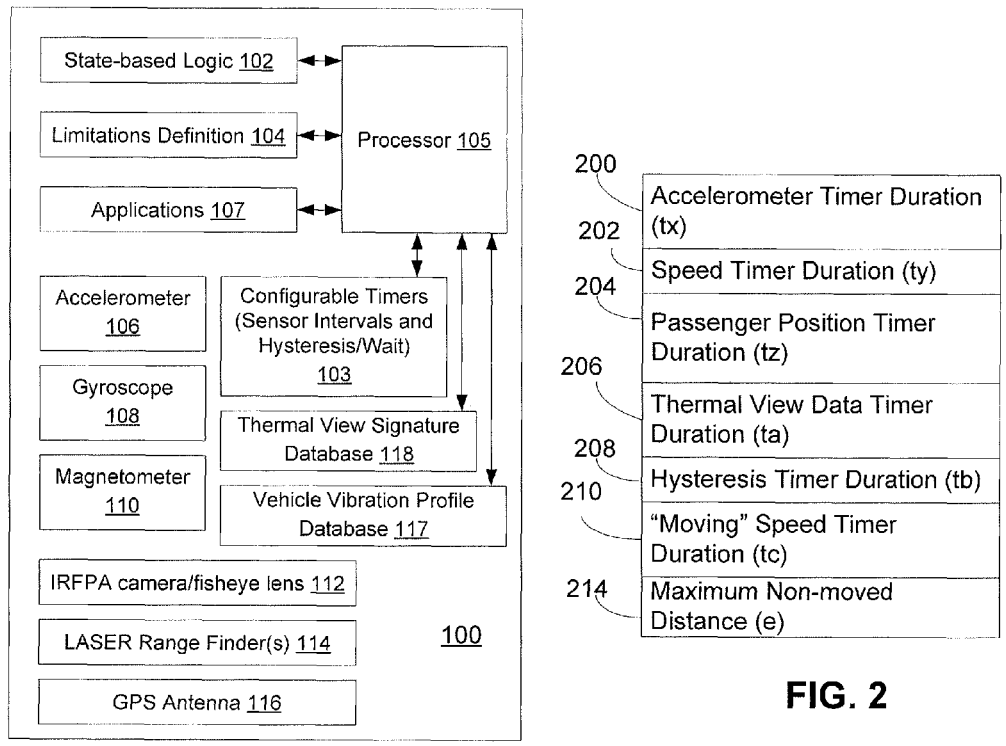
FIG. 1A
FIG. 2
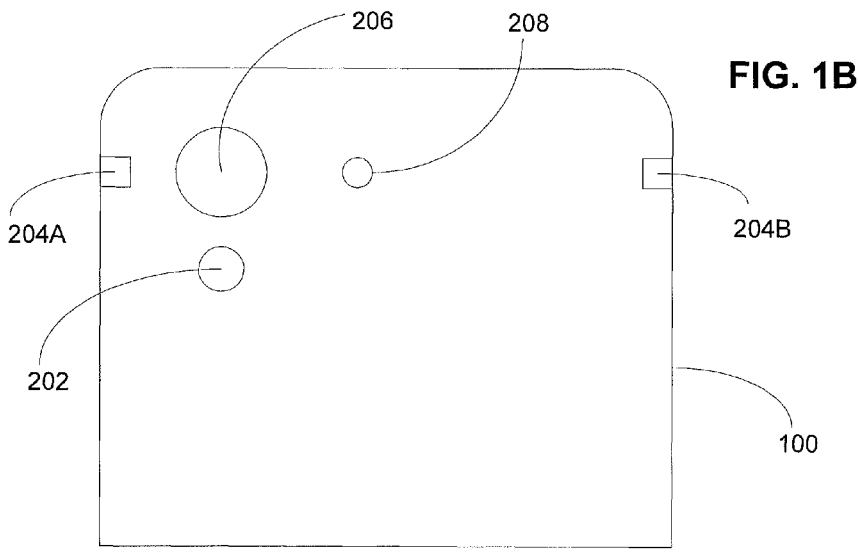
FIG. 1B

MOBILE WIRELESS DEVICE INCORPORATING SELF-DETECTION OF OPERATIONAL ENVIRONMENT AND SELECTIVE DEVICE FUNCTIONALITY

FIELD OF THE INVENTION

This invention relates generally to the field of mobile wireless communications devices and associated functionality/services. More particularly, the invention is directed to automatically detecting an operating environment of a particular mobile wireless device and limiting user access to certain device functionality (e.g., modes of operation, services provided) in response to detecting certain operating environments (e.g., operation of mobile wireless device within a moving vehicle by a driver).

BACKGROUND OF THE INVENTION

Proliferation of mobile wireless devices, including cellular phones, smart phones, and even tablet PCs, and their use throughout the course of the day, has profoundly affected our lives. Mobile wireless technologies enable users to access a variety of on-line and otherwise connected users and information resources. Such ubiquitous connectivity keeps us within a couple keystrokes/screen touches of an unlimited supply of information, entertainment and human contacts/resources.

However, the substantial benefits provided by mobile wireless technologies are tempered, to a certain degree, by a growing concern that vehicle operators are utilizing, under inappropriate circumstances, certain services/functionality delivered by mobile wireless devices. A recognized example of such inappropriate use is "texting while driving." In such situations, the driver momentarily turns attention away from the driving task to read or prepare a text message. There are several other circumstances where a device user may be distracted by mobile wireless device services/functionality while operating a vehicle.

Driver distraction, in particular distraction caused by use of functionality/services (e.g., text messaging) provided by mobile wireless devices with voice, text, and/or data capability, is suspected in a significant number of vehicle crashes and collisions. Public service messages have been created and broadcast in campaigns seeking to raise public awareness of the dangers of utilizing mobile wireless device functionality/service requiring substantial driver attention (e.g., texting) while driving.

To address the danger of driver distraction, as mobile wireless device functionality continues to grow, various government entities have sought to enact laws limiting use of mobile wireless devices (e.g., hands-free use only) while driving. While enacting such laws is commendable, a threat of potentially receiving a ticket is likely insufficient to prevent a substantial number of drivers from disregarding such laws—in the same way that fines do not prevent speeding by a substantial number of drivers. The threat of a fine alone is likely insufficient to deter use of text messaging or other potentially distracting mobile wireless device services by users while driving a vehicle.

In addition to enacting laws, mobile wireless device makers and service providers have attempted to build in voluntarily activated service limiting measures on mobile wireless devices. Such voluntary/opt-in measures include: user-configurable application settings that disable text and data services/functionality, text-to-voice and voice-to-text translators that permit drivers to communicate without visually accessing the device interface, setting the device to airplane mode, etc. However, such voluntary/opt-in measures do not fully address driver distraction. For example, voice-to-text/text-to-voice translator functionality, which alleviates a need to enter text by hand or read a device display while carrying on a discussion with another via a mobile wireless device, has also come under scrutiny after having been shown in studies to also contribute to driver distraction and a reduce responsiveness to driving events requiring a driver to suddenly stop or perform an evasive maneuver.

SUMMARY OF THE INVENTION

A variety of measures have been implemented to address driver distraction-related accidents arising from mobile wireless device usage by drivers, a superior method and apparatus are described herein that provides a sensor/signal/image based solution to a need to ensure that mobile wireless devices are not used in inappropriate settings.

A mobile wireless device, and method of operating such device is described herein that conditionally disables use of functionality of the mobile wireless device. The mobile wireless device comprises a plurality of sensors for sensing: motion, thermal images in a field of view of a lens, and a side of a vehicle cabin. The mobile wireless device further comprises a non-transitory computer-readable medium including computer-executable instructions and a processor configured with the computer-executable instructions to facilitate performing, on the mobile wireless device, a method including detecting whether the mobile wireless device is traveling within a moving vehicle. The processor is further configured to capture, through the lens of the mobile wireless device, thermal image data points at multiple spatial locations within a field of view of the lens from within the moving vehicle. The processor is further configured to render spatially binned thermal image data from the thermal image data points.

Moreover, the processor is configured with the computer-executable instructions to invoke a driver in possession mode of operation of the mobile wireless device in response to determining a combination of conditions including that:

(1) the mobile wireless device performed the capturing while located in the front seat of the moving vehicle, by applying a front seat thermal image signature definition to the spatially binned thermal image data, and (2) the mobile wireless device is located on a driver side of the moving vehicle.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 1A is a schematic diagram identifying components incorporated into a mobile wireless device to facilitate carrying out exemplary embodiments of the invention;

FIG. 1B is an outline drawing of an exemplary physical arrangement of various sensors/lens on a mobile wireless device for carrying out embodiments of the invention;

FIG. 2 is an exemplary set of configurable parameters utilized during the operation of the exemplary state-based logic;

DETAILED DESCRIPTION OF THE DRAWINGS

Figure 3:
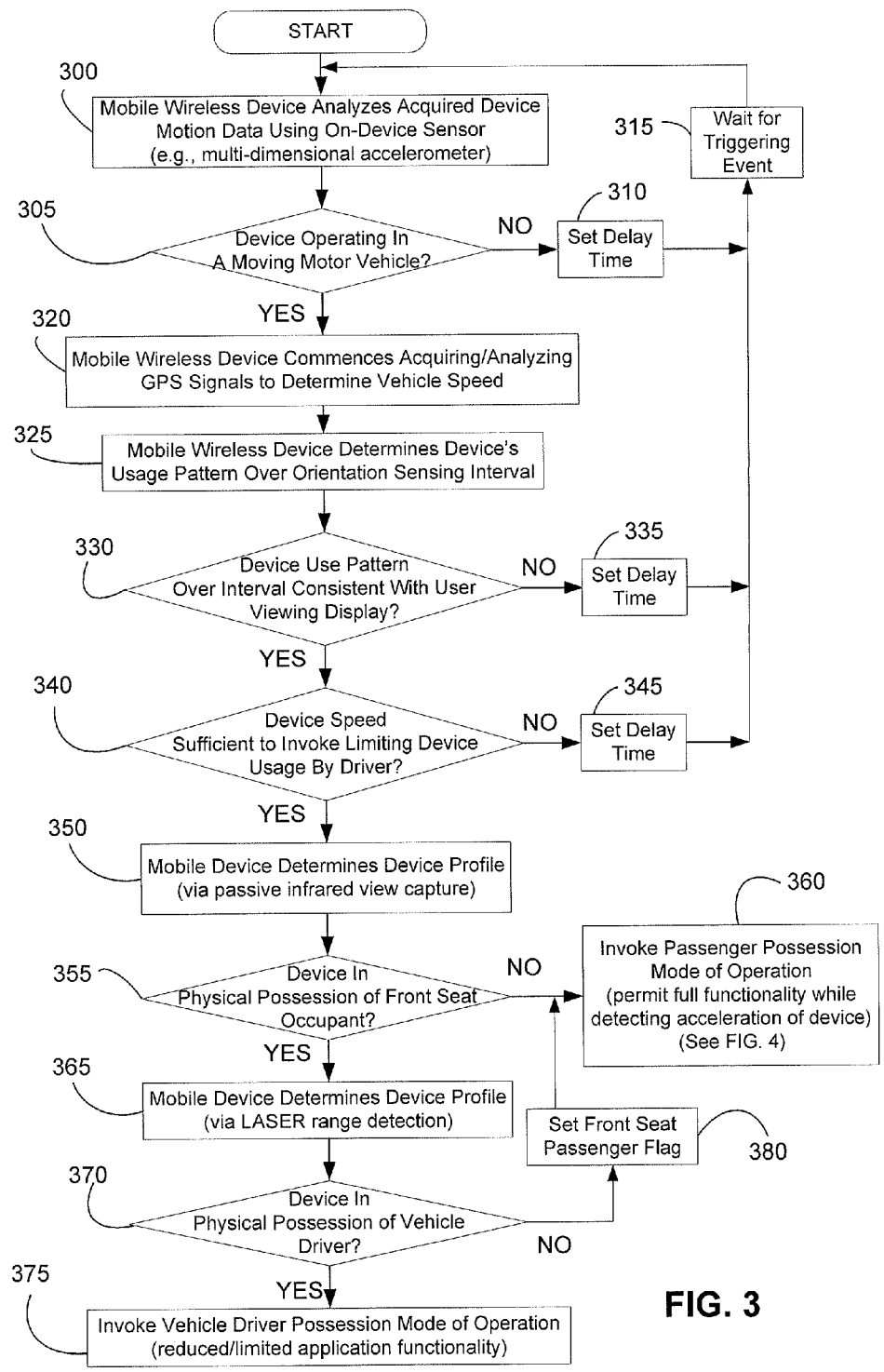
FIG. 3 is a flowchart summarizing exemplary operations carried out by the state-based logic to determine whether a mobile wireless device is in the possession of a vehicle driver and then restrict application functionality/features according to a limitations definition.

The following illustrative examples further describe the invention. They should not however, be construed as limiting its scope to any particular described structures or steps.

A system and method are illustratively depicted and described herein for implementing/incorporating device-centric mechanisms within mobile wireless devices that conditionally disable mobile wireless services/functionality accessed by a vehicle driver in response to a multi-stage-based combination of detected operating conditions. During a vehicle motion detection (first) stage, the device uses on-device sensors (accelerometers) to detect that the mobile wireless device is within a moving vehicle. After detecting the device operation within a moving vehicle, the mobile device enters a speed detection (second) stage wherein external signals, such as Global Positioning System (GPS) signals, are analyzed to render a vehicle speed value (e.g., average speed) over an interval. If the (average) speed value is sufficiently high, then the mobile wireless device invokes operations associated with yet another operating environment detection (third) stage wherein the mobile wireless device determines whether the mobile wireless device is currently in the physical possession of the vehicle driver. Such environment detection is based, for example, upon image scan profile data acquired by an imaging element (e.g., infrared camera) embedded within the mobile wireless device. If the mobile wireless device concludes, based upon the acquired image scan profile data, that the device is in the possession of the vehicle driver, then the mobile wireless device enters a driver-in-possession operating mode. In the driver-in-possession mode, the mobile wireless device limits user (determined to be the vehicle driver) access to particular services/functionality of the mobile wireless device.

Such conditionally limited services/functionality include: device-to-ear (hand-held) voice calls, text messaging, and selected data applications. Moreover, the conditional use limiting mobile device distinguishes use of the mobile wireless device by passengers in the moving vehicle from use of the mobile wireless device by a driver. Thus illustrative examples of the conditionally restricted mobile wireless device functionality only apply conditional service/function restrictions to a driver/operator of a moving vehicle. Thus, mobile wireless devices incorporating the conditional service/functionality limiting features described herein sense the position of a user, and will not apply the same conditional limitations to mobile wireless users that are determined, by the device, to be passengers within a vehicle.

Regarding the device's capability of distinguishing between drivers and passengers, the mobile wireless described herein leverages self-contained sensory capabilities (e.g., infrared camera imaging). The mobile wireless device, without any aid by a user, determines whether the mobile wireless device is in the physical possession of a user in the driver seat position of a moving vehicle, and upon such determination the device disables one or more services/functional features of the device (e.g., hand-held mode voice calls, text, and data features). On the other hand, if the device determines that the device is in the physical possession of a user positioned in a passenger seat, the device will allow full service/functional feature access by the passenger.

The proposed use environment detection structures and logic are incorporated fully into the mobile wireless device and do not rely on any external structure, such as a beacon, to be added to a vehicle. Moreover, the position detection logic does not rely upon full camera visual image scan comparisons via stored visual images—such comparison logic being processor intensive and unreliable in poorly lit conditions (e.g., at night). Moreover, the detection logic described herein does not rely solely on global positioning system (GPS) signals— such GPS reliance potentially resulting in slow response times, unacceptably low position resolution, relatively high power consumption, and a need for network assistance.

Turning to FIG. 1A, an illustrative schematic diagram depicts an exemplary implementation of a mobile wireless device 100 including the above-described conditional service/functionality limiting capabilities based upon whether the mobile device is currently being used by a person in a driver seat within a moving vehicle. A programmed/configured aspect of the exemplary implementation of the device 100 includes state-based logic 102 (described in detail with reference to FIGS. 3 and 4 herein below) comprising executable instructions and data stored on a computer-readable medium within the device 100 that is accessed by a processor 105. In the illustrative embodiment, elements of the state-based logic 102 are carried out in accordance with a set of configurable parameters 103 (described in detail with reference to FIG. 2) to carry out a set of limitations on executable applications 107 in accordance with a limitations definition 104.

In an illustrative example, the mobile wireless device 100 utilizes embedded (e.g., native to the mobile wireless device), non-network-aided, sensors to acquire motion-related information sufficient to enable the decision logic of the mobile wireless device to determine whether the device is currently moving at a sustained speed exceeding a prescribed threshold speed. An accelerometer 106 measures the gravitational pull (acceleration) on three axes: x, y, and z. The accelerometer 106 gauges an orientation of a stationary platform relative to the Earth's surface. If the device 100 is in free fall, then acceleration measured by the accelerometer 106 will be shown to be zero. If it is only accelerating in a particular direction the acceleration will be indistinguishable from the acceleration being provided by the earth's gravitational pull. Importantly, the accelerometer 106 is excellent at sensing vibration (minute transient accelerations of the device).

A gyroscope 108 measures a rate of rotation around a particular axis at an angular rate, and helps maintain orientation. The gyroscope 108, in the exemplary implementation, determines the X, Y, and Z orientations for a device.

In the illustrative example, the gyroscope 108 and accelerometer 106 provide complimentary motion data streams that aid determining a current physical status (e.g., motion speed, orientation) of the mobile wireless device 100. The gyroscope 108 helps measure or maintain orientation of the device 100, using the principle of conservation of angular momentum. The accelerometer 106 measures minute changes in velocity (i.e., speed in a particular direction). The accelerometers 106 incorporated into the mobile wireless device 100 are sufficiently sensitive and responsive to facilitate record minute changes within very short time frames—e.g., vibrations attributable to wheeled vehicle movement. The data stream rendered by the gyroscope 108 indicates an angular change/rate, whereas each data stream from the accelerometer 106 indicates a linear acceleration in a given direction.

A magnetometer 110 measures magnetic fields. The Earth has a significant magnetic field, which enables using the magnetometer as a compass. As such the magnetometer 110 provides data for determining, at any given point in time, absolute orientation of the mobile wireless device 100 in the North-East-South-West plane along the Earth's surface.

The mobile wireless device 100 includes, among other things, known data processing functionality that combines accelerometer, gyroscope, and magnetometer data to render a currently sensed orientation of the mobile wireless device 100. Each of these three sensors makes a unique contribution to the overall orientation sensing capabilities of the mobile wireless device 100. For example, the magnetometer 110 is not generally useful for tracking fast movements, but the magnetometer 110 has substantially zero drift over time periods of interest in the currently disclosed illustrative examples. The gyroscope 108, on the other hand, has excellent transient response and reacts quickly and accurately to sudden changes. However, the gyroscope accumulates substantial absolute orientation reading error over time. The gyroscope 108, to provide an absolute orientation reading, is calibrated using a known orientation (provided by the magnetometer 110). Combining the position and motion readings rendered by the magnetometer 110 and the gyroscope 108, respectively, permits quick and accurate determinations of the position and orientation of the mobile wireless device 100, with negligible drift over time.

The exemplary device 100 also includes an IRFPA (infrared focal plane array) camera/fisheye lens 112 that acquires passive infrared energy radiated from physical structures within a field of view. A LASER range finder 114 takes distance readings lateral to the device 100 to facilitate determining a side of a vehicle compartment within which the device 100 is currently being held (when properly oriented for taking a range reading). The device 100 is also equipped with a GPS antenna 116 and associated signal processing for receiving GPS signals and rendering a current geospatial location from the received signals.

The exemplary device 100 furthermore includes databases containing reference data for comparison to vibration and thermal view sensor data. A vehicle vibration profile database 117 stores a set of vibration parameter values to which accelerometer readings are compared to determine whether the device 100 is operating within a moving vehicle. A thermal view signature database 118 stores a plurality of thermal signature data sets to which live captured thermal view data is compared to render a determination of whether a current user of the device 100 is located in a front seat of a passenger cabin of a vehicle at the time of thermal sensor data capture. The contents of the thermal view signature database 118 are described further herein below with reference to a described method for restricting operational modes of the device 100 based upon a current position of the device within a vehicle passenger cabin.

Turning briefly to FIG. 1B, an exemplary physical arrangement for a fisheye lens 202 of the IRFPA camera/fisheye lens 112 is depicted. The exemplary infrared camera system captures an image using medium/long-wave infrared focal plane array (IRFPA) sensors. A set of LASERs 204A and 204B of the LASER range finder 114 are positioned on opposing sides of the mobile wireless device 100. The mobile wireless device 100 is further equipped with a standard still/video camera lens 206 (color video) and a light source 208 used in conjunction with the lens 206. However, the light source 208 is not used for rendering an IRFPA image using the fisheye lens 202.

Turning to FIG. 2, a set of data fields/structures are identified. This data/information is used to configure and drive the operation of the state-based logic 102 in accordance with a situation-based application services/functionality limiting process described herein below with reference to FIGS. 3 and 4. Such process is used to selectively limit use, by the vehicle driver, of particular application services/functionality embedded into the mobile wireless device 100 while operating a vehicle. An accelerometer timer duration 200 stores a value (tx) identifying a time span within which accelerometer data is acquired for analysis to determine whether the device 100 is currently being used within a moving vehicle. By way of example, a value for tx corresponding to 0.3 seconds is stored in the accelerometer timer duration 200. However, longer and shorter specified times are also suitable. A speed timer duration 202 stores a value (ty) identifying a time span within which GPS data is logged for processing to determine whether the device 100 is traveling at a sufficiently high speed (e.g., 3 km/hr) to invoke steps for determining the position of the device 100 within a moving vehicle. By way of example, a value for ty corresponding to 0.3 seconds is stored in the speed timer duration 202. However, longer and shorter specified times are also suitable. A passenger position timer duration 204 stores a value (tz) identifying a time span within which device position data relative to the moving vehicle (i.e., within the passenger compartment) is logged for processing to determine whether the device 100 has been moved to a different position within the passenger compartment—indicative of use by a different occupant of the vehicle's passenger compartment. By way of example, a value for tz corresponding to 0.3 seconds is stored in the passenger position timer duration 204. However, longer and shorter specified times are also suitable. A thermal view timer duration 206 stores a value (ta) identifying a time span within which passive infrared view data is acquired for analysis to determine whether the device 100 is positioned in the front seat area of a moving vehicle. By way of example, a value for ta corresponding to 2 seconds is stored in the thermal view data timer duration 206. However, longer and shorter specified times are also suitable. The values stored for each of the above describe time duration fields 200, 202, 204 and 206 define data logging windows within which data is captured by the device 100 for purposes of carrying out the logical tests/steps depicted in FIGS. 3 and 4.

A hysteresis timer duration 208 specifies a wait time value (tb) identifying a time span within which the device 100 waits, once it is determined that the device 100 is not in the possession of a driver of a moving vehicle, before performing further tests regarding current physical location of the device 100 within a vehicle based upon whether a vehicle has substantially stopped moving (once it has been determined that a vehicle is indeed moving). By way of example, a value for tb corresponding to 5 minutes, is stored in the hysteresis timer duration 208. However, longer and shorter specified times are also suitable.

A moving speed timer duration 210 stores a value (tc) identifying a time span within which GPS data is logged for processing to determine whether the device 100 is moving sufficiently fast (e.g., greater than 1 km/hr) to still be considered moving. By way of example, a value corresponding to 1 second is stored in the moving speed timer duration 210. However, longer and shorter specified times are also suitable.

A maximum non-moved distance 214 specifies an amount of movement of the device 100 within the vehicle that will invoke logic to re-determine the position of the device 100 within the vehicle.

Turning to FIG. 3, a flowchart summarizes operation of exemplary probabilistic state-based logic incorporated into the mobile wireless device 100 such as the one described herein above with reference to FIGS. 1A and 1B that includes data sources providing real-time data, described herein above with reference to FIG. 2, driving the probabilistic state-based logic. The mobile wireless device 100 applies the probabilistic state-based logic to the real-time data to limit services/functionality provided by one or more applications executing on the device 100. The exemplary state-based logic summarized in FIG. 3 operates on multiple, conditionally activated/gated, data streams (recorded over a specified time window) from the embedded sensors (e.g., accelerometer, gyroscope, magnetometer, etc.), signal receivers (e.g., GPS signal receiver), and imaging/camera inputs (e.g., infrared fisheye camera/lens). The state-based logic, based upon specified configuration parameters and the conditionally applied data streams, makes a probabilistic determination whether the mobile wireless device 100 is operating in a particular one of multiple potential physical operating environments.

Thereafter, the state-based logic applies the currently determined physical operating environment to an environment-based services/functionality limitations definition 104. If the limitations definition 104 calls for a provided application service/functionality to be disabled in the currently determined physical operating environment, then the mobile wireless device 100 takes a prescribed remedial action (e.g., disabling/deactivating the services/functionality, issuing a warning or audible instruction, recording an unsafe usage event, activating a timer to take a further action to limit further usage of a service/functionality, etc.) in accordance with the limitations definition 104 stored within memory on the mobile wireless device 100. Thus, the described mobile wireless device 100 includes hardware that acquires real-time streaming data and stored software programs, including configured probabilistic state-based logic, that, in combination, facilitate conditionally limiting access by the vehicle driver to services/functionality provided by applications on the mobile wireless device 100 while the vehicle is in motion.

Having described the general functionality of the state-based logic 102, attention is now directed to the particular exemplary steps, summarized in FIG. 3, carried out by a particular exemplary embodiment of the state-based logic 102. After power-on of the mobile wireless device 100, and potentially other enabling circumstances (e.g., a user has attempted to open at least one listed restricted service/functionality), the mobile wireless device 100 executes the operations summarized in FIG. 3 to conditionally limit driver access to particular services/functionality provided by executable applications on the mobile wireless device 100.

The initial gating condition for limiting driver usage of application services/functionality on the mobile wireless device 100 is whether the device 100 is being used within a moving motor vehicle. Thus, during step 300, the mobile wireless device 100 determines parameter values indicative of motion characteristics of a mobile wireless device. The motion characteristic-related parameter values are acquired by self contained sensors on the mobile wireless device 100 over a specified time duration (tx) configured in the accelerometer timer duration 200 (e.g. 0.3 seconds). By way of example, during step 300 a data stream, from each one of the three dimensional (X, Y and Z) sensors of the accelerometer 106 over a period of time (i.e., in each of three orthogonal spatial dimensions), is acquired and analyzed. Analysis of the accelerometer data streams includes comparing signal characteristics such as frequency response, rendered from the data acquired during step 300, to a characteristic profile (e.g. the vehicle vibration profile database 117) for the mobile wireless device 100 within a moving vehicle. By way of example, low frequency physical vibration aspects of the accelerometer signal streams may differ substantially between modes of transporting the device 100, such as by walking, cycling, and traveling in a four-wheeled motor vehicle (the case of particular interest herein). It is noted that alternative logic (to the logic summarized in FIGS. 3 and 4) may be implemented by the device 100 for cases where the device 100 is in the possession of a bicycle rider or motorcycle driver. A low amplitude high frequency signal characteristic associated with tire tread meeting a traveled surface may also be used to distinguish automobile and truck transportation modes from various other modes of transportation.

Thereafter, during step 305, if the analyzed signal characteristics indicate that the device is not within a moving motor vehicle, then control passes to step 310. During step 310 a configurable delay period timer is set (for executing a next iteration of step 300). Such period can be a few seconds, several seconds, or even minutes. The wait period may also vary based upon other factors. Such factors include, for example, a value of a counter indicating previous repeated indications of no detected vehicle movement during step 305. Control then passes to step 315 wherein the process enters a wait state until a triggering event (e.g., the delay period expires) occurs. The triggering event could be a user requesting a service/functionality identified in the limitations definition 104 discussed previously herein above with reference to FIG. 1A.

The accelerometer 106 provides a reliable, low energy consuming, source of signal data indicative of a vehicle moving at a speed above about 2 miles per hour. Thus, the accelerometer 106 is an energy-efficient and reliable source for an initial gating mechanism used to determine motion of the mobile wireless device 100 in accordance with embodiments described herein.

Thus, if at step 305, the analyzed signal characteristics indicate that the device is within a moving motor vehicle, then control passes to step 320. During step 320, the mobile wireless device 100 commences reading and processing GPS readings to determine a current speed of the mobile wireless device 100. During step 320 the probabilistic state-based logic 102 activates GPS signal acquisition/processing for rendering a geospatial location (and speed) based on a stream of signals provided from the GPS antenna 116 on the device 100 and uses a subsequently received GPS signal data stream to resolve speed and direction of movement of the mobile wireless device 100. Such GPS signal acquisition/processing can be performed within the device 100 or, alternatively, in association with a networked server. By way of example, a time-ordered sequence of GPS measurements, over a specified time duration (ty), are analyzed to render an average speed of the device 100 over the time interval having the specified duration ty.

Moreover, during step 325, which may occur at any of a variety of times, signal values, acquired during a time interval having a specified time duration (e.g. tx for accelerometer readings), are analyzed to determine whether a sensed usage pattern of the device 100 is consistent with a use profile for a user viewing a display of the device 100. Such usage pattern may be one or more of signal streams relating to device movement and orientation (per input signals rendered by the accelerometer 106) as well as sensed touch patterns (e.g. spatial, temporal, data input, etc.) on a touch screen of the device 100 over a time period that, in contrast to a relatively short time period tx for accelerometer reading, may last several seconds. In the case of spatial/temporal patterns, the sensing of multiple deliberate touches at different locations within a short period of time may be interpreted to be consistent with text or gaming input. A data input determined to be a recognized word would indicate use of a text interface.

Other ways to detect usage of the device 100 in a way requiring the user to view the display of the device are also contemplated.

Thereafter, if at step 330, the movement, orientation, and/or touch screen input of the device 100 over the time interval having a duration tx is determined to be inconsistent with a user viewing the display of the device 100, then control passes to step 335. During step 335, a configurable delay period timer is set (for a period that may differ from a time period specified during step 310). Control then passes to step 315.

If however, at step 330 the sensed orientation of the device 100 or detected usage pattern over the detection interval (during step 325) is consistent with a user viewing the display of the device 100, then control passes to step 340. During step 340, the probabilistic state-based logic 102 accesses a currently calculated average speed of the device 100 based upon previously acquired GPS data. If the device 100 is traveling at an average speed insufficient to invoke device use limitations (e.g., average speed does not exceed 2 miles per hour), then control passes to step 345. During step 345, a configurable delay period timer is set (for a period that may differ from a time period specified during step 310 or during step 335). Control then passes to step 315.

If however, at step 340 the sensed average speed of the device 100 is sufficient to invoke limiting usage of application services/functionality on the device 100, then control passes to step 350 wherein further processing steps are conditionally invoked to determine whether the device 100 is being used by a driver or a passenger in the moving motor vehicle. Use limitations are invoked only upon determination that the device 100 is currently being used by the driver of the moving vehicle, and thus further steps are taken to determine an actual physical position of the mobile wireless device 100 within the moving vehicle.

During step 350, the mobile device 100 determines a device profile using a passive infrared camera for purposes of determining whether the device 100 is in the possession of a person in a front seat of a passenger cabin of the moving motor vehicle. During step 350, the probabilistic state-based logic 102 commences infrared thermal capture via the IRFPA camera/fisheye lens 112 that acquires passive infrared energy radiated from physical structures within a field of view. The capturing/logging of thermal image data, acquired at selected positions within a field of view, lasts for a time interval having a duration to (e.g. 2 seconds). In an exemplary embodiment, the fisheye lens 112 must be held at a particular location to facilitate capturing a proper set of thermal image data points for comparison to driver and passenger (distinct for front and back) profiles maintained within the thermal view signature database 118 of the mobile wireless device 100. Such proper positioning is determined, for example, by the processor 105 and logic 102 analyzing the data streams rendered by the accelerometer 106, gyroscope 108, and magnetometer 110. The probabilistic state-based logic 102 compares the positioning information with previously stored signature velocity and direction information to determine if a user is holding the device at the valid position, within a specified tolerance, in relation to the direction of the vehicle's travel. Such positioning may entail aligning the screen of the device 100 so that the screen is perpendicular to the axis of the direction of travel by +/−a certain percentage/degrees along the non-correlated axes. This would indicate that the possessor of the device 100 has the back of the device 100 (and the fisheye lens 112) facing towards the direction of travel (which should be the front of the vehicle cabin). This is the range of positions for which text or data would be used. Other constraints and tolerances may be employed. Additionally and/or alternatively, the thermal image data point set acquired by the device 100 during step 350 may be used to determine proper orientation. For example, an improperly oriented infrared camera will render a set of spatially tagged thermal image data points having a pattern that does not match any of the stored profiles/signatures of the database 118.

During step 350, if the processor 105 and state-based logic 102 determine that the fisheye lens of the infrared thermal sensor is not in a proper capture position/orientation, then an alert is issued by the device 100 (e.g., an audible request, a vibration, etc.) requesting the user to properly position the device 100 for capture of a thermal image for comparison to stored profiles indicative of various user positions in a vehicle (e.g., front driver, front passenger, back passenger, etc.). The user does not need to look at the screen in order to position the device properly. Instead, the user can follow, for example, sound or vibration-based cues to guide the device to the proper capture position.

Though the process summarized in FIG. 3 assumes (eventual) user compliance with the request to properly position the fisheye lens for thermal image capture, if the request for proper positioning is not met after a period of time and/or multiple alerts issued by the device 100, then the state-based logic 102, after failing to register user compliance with the device's previously issued positioning request, automatically enters a driver in possession mode (step 275 described below). Also, thermal view data collection is started prior to capture position verification to improve device response time.

During step 350, once the fisheye infrared thermal sensor is in the capture position and a set of thermal view data points in the fisheye lens' field of view have been captured, control passes to step 355 wherein the set of captured thermal view data points is compared to stored profiles (signatures) stored in the thermal view signature database 118. Multiple signatures/profiles are stored in the database 118 corresponding to various vehicle cabin locations including, for example, at least distinct thermal image signature definitions for: (1) a backseat passenger and (2) a front seat passenger. Though there are many vehicle designs, thermal image patterns are generally always distinguishable between images taken from a front seat and a backseat of a vehicle cabin regardless of outside temperatures or light conditions. This distinction is generally a result of the diffusion of heat on a windshield—as opposed to the back of a front seat where various combinations of obstructions (e.g. head rests) within the captured field of view of the lens 112 result in greater variances in the upper portion of the lens 112 field of view (when the device 100 is properly oriented during image capture). Thus, the logic 102 can detect whether the current user of the device 100 is in the front or back seat by analyzing a set of thermal image points (grouped in bins corresponding to particular spatial positions within the lens 112 field of view) of the top half of the thermal sensor image. In particular, data value patterns of the set of binned thermal image data points are compared to the sets of data patterns maintained by the device 100 in the thermal view signature database 118 to render a match to either a front or rear seat thermal image pattern.

Thus, during step 355, the probabilistic state-based logic 102 determines, through thermal signature processes (e.g. pattern matching), whether or not the device is front seat or a rear seat passenger. This is done through the use of relatively simple thermal signature comparison and/or pattern recognition using distinct definitions/patterns, which are stored in the thermal view signature database 118, corresponding to the front and the rear seating of a vehicle cabin. Though a variety of comparisons are contemplated for determining whether the device 100 is in the front/back seat of a vehicle cabin, the comparison/test carried out during step 355 specifically does not rely upon any type of shape recognition of objects within the thermal view. Instead, in an exemplary embodiment, the processor 105 and logic 102 determine whether the device 100 is in a front seat occupant's possession by analyzing relative temperature value patterns (typically represented visually in red/green/blue pixels in known thermal imaging systems) of the long-wavelength infrared data point bins (corresponding to spatial positions within the lens 112 field of view during thermal image capture). In particular, the relative thermal values of the data point bins corresponding to the upper half and lower half of a field of view of the fisheye lens 112 image captured during step 350 are analyzed.

In particular, the binned long-wavelength infrared data for particular spatial locations within each of the upper and lower parts of the captured IR image includes "colorized" image values for pixels (e.g. red, green, blue values having a value between 0 and 255). Thus, a bin of pixel values for a long-wavelength infrared image having a "cadmium red" average pixel value would differ from a bin of pixels (at another spatial location within the lens 112 field of view) having a "cadmium yellow" average. Binned image values that differ from one another more are referred to as having a relatively high variance.

Having established that the different thermal conditions within a field of view of the lens 112 can be detected through the use of spatial position binning, the logic 102 and processor 105 are configured to compare binned infrared image data captured/rendered during step 350 to thermal signatures stored in the thermal view signature database 118 to determine whether the device 100 is in the possession of a front seat occupant of the moving motor vehicle. By way of example, the front seat signature of the motor vehicle exhibits relatively high "uniformity" across binned thermal image points at the top half of the field of view (the windshield) and relatively high "variance" for thermal image data bins corresponding to thermal image data taken from spatial locations within the bottom half of the field of view of the lens 112 during thermal image data acquisition.

The binned data point signature for a thermal image taken from a back seat differs substantially from the front seat signature described above. In particular, the binned infrared image data captured at spatial positions in the top half of the field of view of the lens 112 taken from the back seat will exhibit comparatively less uniformity (i.e. higher variance) than the binned thermal image data at the top half of the field of view of the lens 112 taken from the front seat. The distinction between signatures for the top half of the field of view for front/back seat views is due to the presence of front seat headrests that partially obscure a backseat view of the windshield (the source of thermal view uniformity for a top half of a front seat thermal image).

The following is a particular example of the test performed during step 355. Initially, the device 100 captures infrared image data points sufficient to render bins from "x" distinct spatial positions in the top portion of the fisheye lens 112 field of view. The device 100 also captures image data points sufficient to render "y" bins from spatial positions in the bottom portion of the fisheye lens 112 field of view. For each bin of pixels in both the top and bottom portions of the captured field of view, the processor 105 calculates an average value for each R, G, B component of the bin. For an example with five (5) bins for each top and bottom portion of the signature, the averaged R/G/B component values for the captured/encoded infrared image data points might look something like this:

Top Portion:
Bin 1: R234, G136, B20
Bin 2: R257, G146, B40
Bin 3: R238, G128, B37
Bin 4: R260, G150, B18
Bin 5: R232, G120, B56
Bottom Portion:
Bin 1: R165, G36, B234
Bin 2: R100, G142, B208
Bin 3: R64, G203, B150
Bin 4: R118, G250, B125
Bin 5: R2, G1, B146

The variance in the values from the bins rendered for the top portion are compared to a front top signature maintained by the processor 105 and logic 102 for a front seat view. If the variance across the five bins (corresponding to five distinct positions in the top field of view) is within a range of tolerance when compared to a variance for the front top signature, then the device position is designated as being in the possession of a front seat occupant. On the other hand, substantial variance between values of different ones of the bins in the top portion (similar to variance exhibited by binned image data taken from the lower portion of the field of view) indicates the device 100 is possessed by a backseat occupant.

If at step 355, the probabilistic state-based logic 102 determines, through thermal image signature matching, that the user of the device 100 is not a front seat occupant, then control passes to step 360 wherein the state-based logic 102 executes in accordance with a "passenger in possession" operating mode.

During step 360, while in the possession of a passenger, the state-based logic 102 exhibits the following exemplary behaviors:

1. Allow normal operation for voice, data, and text for a specified "hysteresis" time duration (tb);
2. Maintain a running log of thermal sensor data for a specified time duration (td);
3. Maintain a running log of speed for a specified time duration (tc); and
4. Maintain a running log of device positional data for a specified time duration (tz).

In association with behavior "4" if the device position has moved greater than a specified distance "e" at an angled offset from a primary directional vector of the device (i.e., the primary direction of travel of the moving vehicle), then return to step 350 (path not shown in FIG. 3) to capture/log thermal image data to determine whether the new position of the device is in the driver position of the moving vehicle.

In accordance with behavior "1" if the "hysteresis" timer has not expired, then continue monitoring velocity.

In accordance with behavior "3" if the speed is greater than one (1) km/hr, indicating that the vehicle is still moving, then control passes to step 350. If the average speed of the device is less than or equal to one (1) km/hr, then the vehicle has effectively "stopped" and the state-based logic 102 resets and control returns to the Start of the operations and decisions summarized, by way of example, in FIG. 3.

Thus, during step 360, passengers are permitted to use the mobile wireless device in a normal user manner. However, during step 360 the state-based logic 102 actively maintains a running log of thermal sensor data for a time interval and senses position changes of the device within the vehicle to detect any significant movement of the device 10 within the moving vehicle. Thus, the state-based logic 102 ensures that the device 100 is not activated from another position in the vehicle cabin by another user or the same user, and then re-positioned to the driver/operator position within the vehicle without activating the state-based logic 102 to limit application services/functionality in accordance with the limitations definition 104. A particular detailed example of logic executed during step 360 is described herein below with reference to FIG. 4.

Continuing with the description of FIG. 3, if at step 355, the probabilistic state-based logic 102 determines that the user of the device 100 is in a front seat, then control passes to step 365. During step 365, the state-based logic 102 activates LASER-based range detection using embedded LASERs on the mobile wireless device 100 to render a set of lateral LASER range determinations. For example, two lateral measurements are potentially sufficient to render a determination whether the mobile wireless device is currently in possession of a driver or a front seat passenger. When the device is properly held up by the device holder (upright and in front of the holder), if the device is in the possession of the driver, then a measured left distance is likely smaller than a measured right distance, based upon the typical position of the driver seat in a motor vehicle. Given the cluttered environment of the interior of a vehicle, lasers provide more precise measurements than entire views rendered by image scanners such as the fisheye camera, which is what is needed to determine small distance measurements rendered by the LASER range finders at various potential user positions in a vehicle. After satisfactory measurements have been acquired using the LASER range finders to render a useful position signature (for identifying one of the potential front seat positions), control then passes to step 370.

The following is an exemplary test performed during step 370 to determine whether the driver is in possession of the device 100, previously determined to be possessed by a front seat occupant at step 355. Laser ranging in the device 100 would operate like current laser distance finders used to measure distances to relatively high degree of precision for home improvement projects. Laser range finders are incorporated on both sides of the device 100 to provide a distance to an object from both a right side and left side of the device 100.

A range signature is maintained by the logic 102 and processor 105 for comparison to actual measurements taken by the device 100 held in a proper "measurement" position by the front seat occupant in possession of the device 100. The measurements are compared to the stored range signature to determine if the user in possession of the device 100 is in the driver's seat or passenger seat.

The following is an exemplary signature definition stored in the device 100 for use by the logic 102 and processor 105 during step 370:

Left range <2', right range 3-5', set driver flag

Left range <2', right range ∞, set driver flag (passenger window rolled down)

Left range ∞, right range 3-5', set driver flag (driver window rolled down)

Left range 3-5', right range <2', set passenger flag

Left range 3-5', right range co, set passenger flag (passenger window rolled down)

Left range ∞, right range <2', set passenger flag (driver window rolled down)

Left range ∞, right range ∞, undetermined location. Set driver flag as a precaution.

If, during step 370, the comparison, of the LASER range data acquired during step 365 to the LASER range finder signature data stored on the device, indicates that the mobile wireless device 100 is (or may be due to an inconclusive combination of measured range values) in the possession of a driver/operator, then control passes to step 375 wherein the state-based logic 102 invokes a vehicle driver in possession mode of operation wherein certain application services/functionality are limited in accordance with the limitations definition 104.

If, during step 370, the comparison of the captured range data and stored signature distance combinations indicates that the front seat passenger is in possession of the mobile wireless device, then control passes to step 380 wherein a front seat passenger in possession flag is set. Such flag setting, incorporated into an exemplary implementation, facilitates distinguishing front seat and back seat possession of the device 100 by a passenger in recognition of the greater potential for a front seat passenger to show a display on the mobile wireless device 100 to the vehicle driver. Control then passes to step 360 described previously herein above.

During step 375, after determining the device 100 is in the possession of the driver, the state-based logic 102 implements, by way of example, the following:

1. Disabling application/device functions and/or interfaces based upon operator or government mandated options specified in the limitations definition 104;

2. Maintaining a running log of GPS-based device position changes (for determining an average speed) of the device 100 for a time interval having the time duration tc; and 3. If the average speed is greater than one (1) km/hr over the duration tc of the time interval (indicating that the vehicle is still moving), then maintaining disablement of functions and/or interfaces based upon operator or government mandated options; and returning control of the state-based logic 102 to the "start" of the exemplary set of operations and decisions summarized in FIG. 3 if the average speed over the interval is less than or equal to one (1) km/hr (i.e., the vehicle has effectively "stopped").

In exemplary embodiments, in recognition of the important nature of certain functionality of the mobile wireless device 100, during step 375 "emergency services" functionality is exempt from the disablement operation on certain application services/functionality.

Regarding I/O services/functionality disabled by the state-based logic 102, based upon operator or government mandated options, such options include, but are not be limited to:

1. Disabling voice, data, and text;
2. Disabling data and text, enable voice;
3. Disable text and enable voice and data;
4. Disable all "touch" access, but maintain "voice" command/control/input access;
5. Screen lock—preventing viewing information/graphics on the display screen;
6. Screen lock with voice-activated and controlled applications (see applications limitations below) available; and
7. Enabling emergency services for all options.

Regarding application limitations imposed by the state-based logic 102, based upon operator or government mandated options, such options include, but are not limited to:

1. simple messaging service (SMS) applications;
2. mobile messaging service (MMS) applications;
3. voice services applications such as: SKYPE, GOGGLE voice, WhatsApp, etc.
4. file sharing or cloud-based services;
5. games;
6. productivity;
7. camera-based applications;
8. video players; and
9. rich communication services (RCS), including: video sharing, presence, and file sharing services.

Figure 4:
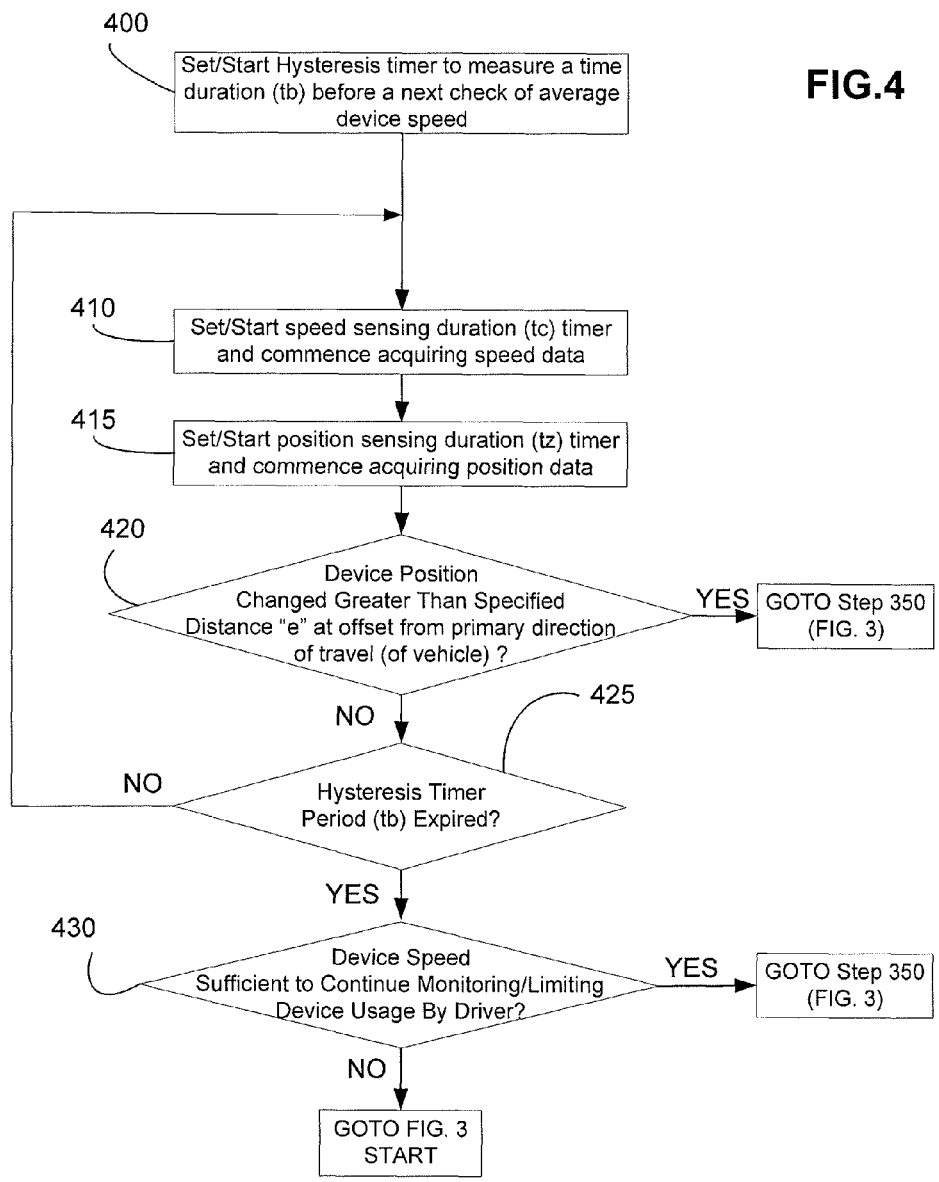
FIG. 4 is a flowchart illustratively depicting a set of exemplary steps carried out by the state-based logic while operating in the passenger-in-possession mode.

Turning to FIG. 4, a set of steps are summarized for an exemplary implementation of the passenger-in-possession mode operations executed by the state-based logic 102 during step 360. Initially, during step 400, a hysteresis timer is set to measure the time duration (tb) wherein normal operation of the mobile wireless device 100 is permitted for voice, data, and text. After setting and starting the hysteresis timer, control passes to step 410, where the state-based logic 102 sets a speed sensing timer and commences acquiring the running log of speed for the specified time duration (tc). After commencing acquiring the running log of speed, control passes to step 415. During step 415, the state-based logic 102 sets a position sensing timer and commences acquiring/logging device positional data for the specified time duration (tz). Each of the above-mentioned timer periods are, by way of example, set independently and run concurrently once they have been set to measure a specified duration.

Next, after at least the expiration of the duration tz measured by the position sensing timer, control passes to step 420. During step 420, if the device 100 position has moved greater than a specified distance "e" at an angled offset from a primary directional vector of the device (primary direction of travel of the moving vehicle), then operation of the state-based logic 102 returns to step 350 (shown in FIG. 3) to capture/log thermal image data that is thereafter used by the state-based logic 102 to determine whether the new position of the device 100 is in the driver position of the moving vehicle. Otherwise, if the device 100 has not moved a distance greater than "e", then control passes to step 425.

During step 425, if the duration (tb) for the hysteresis timer has not expired, then control returns to step 410 wherein the speed sensing timer is reset for measure the average speed of the device over a period of time tc. Otherwise, if the time tb for the hysteresis timer has expired, then control passes from step 425 to step 430.

During step 430, if the average speed of the device 100 over the period of time tc is greater than one (1) km/hr, indicating that the vehicle is still moving, then control passes from step 430 to step 350 (of FIG. 3). If the average speed of the device 100 is less than or equal to one (1) km/hr, then the vehicle has effectively "stopped" and the state-based logic 102 resets and control returns to the Start of the operations and decisions summarized, by way of example, in FIG. 3.

Thus, during execution of state-based logic 102 in accordance with the exemplary set of steps summarized in FIG. 4, passengers are permitted to use the mobile wireless device in a normal user manner. However, the state-based logic actively maintains a running log of thermal sensor data for a time interval and detects movement of the device within the vehicle while operating in the passenger-in-possession mode to ensure that the device 100 is not activated from another position in the cabin by another user or the same user, and then re-positioned to the driver/operator position within the vehicle without activating the state-based logic to limit application services/functionality in accordance with the limitations definition 104.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each distinct value falling within the range, unless otherwise indicated herein, and each distinct value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method performed by a mobile wireless device for conditionally disabling use of functionality of the mobile wireless device, the method comprising:
   detecting whether the mobile wireless device is traveling within a moving vehicle;
   capturing, through a lens of the mobile wireless device, thermal image data points at multiple spatial locations within a field of view of the lens from within the moving vehicle;
   rendering spatially binned thermal image data from the thermal image data points, wherein the thermal image data points are grouped in bins corresponding to particular spatial positions within the lens field of view; and
   invoking a driver in possession mode of operation of the mobile wireless device in response to determining that:
      the mobile wireless device performed the capturing while located in the front seat of the moving vehicle, by applying a front seat thermal image signature definition to the spatially binned thermal image data, and
      the mobile wireless device is located on a driver side of the moving vehicle.

2. The method of claim 1 wherein detecting whether the mobile wireless device is traveling within the moving vehicle comprises comparing accelerometer readings acquired multiple times over a period of time to a stored vehicle vibration profile.

3. The method of claim 1 wherein the thermal image data points are acquired by an infrared sensor.

4. The method of claim 3 wherein the infrared sensor comprises an infrared focal plane array (IRFPA).

5. The method of claim 3 wherein the infrared sensor is a med/long-wave IRFPA (Infrared Focal Plane Array) sensor.

6. The method of claim 1 wherein determining the mobile wireless device is located on a driver side is based upon applying range values rendered by a laser range finder incorporated within the mobile wireless device.

7. The method of claim 1 further comprising determining a current speed of travel of the mobile wireless device, and bi-passing the invoking operation if the current speed of travel does not meet a speed threshold.

8. The method of claim 1 further comprising determining a current usage pattern of the mobile wireless device, and bi-passing the invoking operation if the current usage pattern is inconsistent with a user viewing a display of the mobile wireless device.

9. The method of claim 1 further comprising detecting a relative movement of the mobile wireless device with reference to the moving vehicle, and in response executing logic for performing the invoking operation conditionally based upon the new position of the mobile wireless device within the moving vehicle.

10. The method of claim 1 further comprising issuing, by the mobile wireless device, an instruction to a user to hold the mobile wireless device in a proper image capture orientation to perform the capturing thermal image data points at multiple spatial locations within a field of view of the lens.

11. The method of claim 10 further comprising entering a default driver in possession mode of operation in response to detecting a user failure to properly position the mobile wireless device in the proper image capture orientation.

12. A non-transitory computer-readable medium including computer-executable instructions performed by a processor on a mobile wireless device for conditionally disabling use of functionality of the mobile wireless device, the computer-executable instructions facilitating performing, on the mobile wireless device, the method comprising:
　detecting whether the mobile wireless device is traveling within a moving vehicle;
　capturing, through a lens of the mobile wireless device, thermal image data points at multiple spatial locations within a field of view of the lens from within the moving vehicle;
　rendering spatially binned thermal image data from the thermal image data points, wherein the thermal image data points are grouped in bins corresponding to particular spatial positions within the lens field of view; and
　invoking a driver in possession mode of operation of the mobile wireless device in response to determining that:
　　the mobile wireless device performed the capturing while located in the front seat of the moving vehicle, by applying a front seat thermal image signature definition to the spatially binned thermal image data, and
　　the mobile wireless device is located on a driver side of the moving vehicle.

13. The computer-readable medium of claim 12 wherein detecting whether the mobile wireless device is traveling within the moving vehicle comprises comparing accelerometer readings acquired multiple times over a period of time to a stored vehicle vibration profile.

14. The computer-readable medium of claim 12 wherein determining the mobile wireless device is located on a driver side is based upon applying range values rendered by a laser range finder incorporated within the mobile wireless device.

15. The computer-readable medium of claim 12 further comprising computer-executable instructions for determining a current speed of travel of the mobile wireless device, and bi-passing the invoking operation if the current speed of travel does not meet a speed threshold.

16. The computer-readable medium of claim 12 further comprising computer-executable instructions for determining a current usage pattern of the mobile wireless device, and bi-passing the invoking operation if the current usage pattern is inconsistent with a user viewing a display of the mobile wireless device.

17. The computer-readable medium of claim 12 further comprising computer-executable instructions for detecting a relative movement of the mobile wireless device with reference to the moving vehicle, and in response executing logic for performing the invoking operation conditionally based upon the new position of the mobile wireless device within the moving vehicle.

18. The computer-readable medium of claim 12 further comprising computer-executable instructions for issuing, by the mobile wireless device, an instruction to a user to hold the mobile wireless device in a proper image capture orientation to perform the capturing thermal image data points at multiple spatial locations within a field of view of the lens.

19. The computer-readable medium of claim 18 further comprising computer-executable instructions for entering a default driver in possession mode of operation in response to detecting a user failure to properly position the mobile wireless device in the proper image capture orientation.

20. A mobile wireless device for conditionally disabling use of functionality of the mobile wireless device, the mobile wireless device comprising:
　a plurality of sensors for sensing: motion, thermal images in a field of view of a lens, and a side of a vehicle cabin;
　a non-transitory computer-readable medium including computer-executable instructions; and
　a processor configured with the computer-executable instructions to facilitate performing, on the mobile wireless device, a method comprising:
　　detecting whether the mobile wireless device is traveling within a moving vehicle;
　　capturing, through the lens of the mobile wireless device, thermal image data points at multiple spatial locations within a field of view of the lens from within the moving vehicle;
　　rendering spatially binned thermal image data from the thermal image data points, wherein the thermal image data points are grouped in bins corresponding to particular spatial positions within the lens field of view; and
　　invoking a driver in possession mode of operation of the mobile wireless device in response to determining that:
　　　the mobile wireless device performed the capturing while located in the front seat of the moving vehicle, by applying a front seat thermal image signature definition to the spatially binned thermal image data, and
　　　the mobile wireless device is located on a driver side of the moving vehicle.

21. The mobile wireless device of claim 20 wherein the sensors comprise an accelerometer, and wherein detecting whether the mobile wireless device is traveling within the moving vehicle comprises comparing accelerometer readings acquired multiple times over a period of time to a stored vehicle vibration profile.

22. The mobile wireless device of claim 20 wherein the sensors comprise an infrared sensor, and wherein the thermal image data points are acquired by the infrared sensor.

23. The mobile wireless device of claim 22 wherein the infrared sensor comprises an infrared focal plane array (IRFPA).

24. The mobile wireless device of claim 22 wherein the infrared sensor is a med/long-wave IRFPA (Infrared Focal Plane Array) sensor.

25. The mobile wireless device of claim 20 wherein the sensors comprise a laser range finder, and wherein determining the mobile wireless device is located on a driver side is based upon applying range values rendered by the laser range finder.

26. The mobile wireless device of claim 20 wherein the processor is configured with computer-executable instructions for issuing an instruction to a user to hold the mobile wireless device in a proper image capture orientation to perform the capturing thermal image data points at multiple spatial locations within a field of view of the lens.

27. The mobile wireless device of claim 26 wherein the processor is configured with computer-executable instructions for entering a default driver in possession mode of operation in response to detecting a user failure to properly position the mobile wireless device in the proper image capture orientation.

* * * * *